(12) United States Patent
Sasaki

(10) Patent No.: US 11,954,624 B2
(45) Date of Patent: Apr. 9, 2024

(54) VEHICLE ALLOCATION SYSTEM, SERVER DEVICE, AND COMPUTER READABLE RECORDING MEDIUM

(71) Applicant: Toyota Jidosha Kabushiki Kaisha, Toyota (JP)

(72) Inventor: Akira Sasaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 17/088,920

(22) Filed: Nov. 4, 2020

(65) Prior Publication Data

US 2021/0142251 A1 May 13, 2021

(30) Foreign Application Priority Data

Nov. 7, 2019 (JP) ................................. 2019-202500

(51) Int. Cl.
| | |
|---|---|
| *G06Q 10/06* | (2023.01) |
| *G05D 1/00* | (2006.01) |
| *G06Q 10/0631* | (2023.01) |
| *G06Q 30/018* | (2023.01) |
| *G06Q 50/30* | (2012.01) |
| *G08G 1/00* | (2006.01) |
| *H04L 9/40* | (2022.01) |
| *H04W 12/06* | (2021.01) |
| *B60K 6/20* | (2007.10) |
| *G06Q 10/02* | (2012.01) |

(52) U.S. Cl.
CPC ..... *G06Q 10/06315* (2013.01); *G05D 1/0276* (2013.01); *G06Q 30/0185* (2013.01); *G06Q 50/30* (2013.01); *G08G 1/202* (2013.01); *H04L 63/0861* (2013.01); *H04W 12/06* (2013.01); *B60K 6/20* (2013.01); *B60Y 2200/91* (2013.01); *B60Y 2200/92* (2013.01); *G06Q 10/02* (2013.01); *G06Q 2240/00* (2013.01)

(58) Field of Classification Search
CPC ........................................................ G06Q 10/06
USPC ........................................................ 705/7.25
See application file for complete search history.

(56) References Cited

U.S. PATENT DOCUMENTS 9,194,168 B1 * 11/2015 Lu ........................... G01C 21/26
10,369,967 B2  8/2019 Sako et al.
(Continued)

FOREIGN PATENT DOCUMENTS

| CN | 108961802 A | 12/2018 |
|---|---|---|
| CN | 109754100 A | 5/2019 |

(Continued)

*Primary Examiner* — Nga B Nguyen
(74) *Attorney, Agent, or Firm* — Dinsmore & Shohl LLP

(57) ABSTRACT

A vehicle allocation system includes: an automatic driving vehicle; a mobile terminal configured to transmit a vehicle allocation request signal containing at least information on a vehicle allocation place of the automatic driving vehicle; and a server configured to allocate the automatic driving vehicle at the vehicle allocation place in response to reception of the vehicle allocation request signal, give a notification to the mobile terminal in response to arrival of the automatic driving vehicle from the vehicle allocation place within a predetermined distance range, and permit usage of the automatic driving vehicle when a user of the mobile terminal is authenticated based on authentication information transmitted from the mobile terminal in response to the notification.

9 Claims, 5 Drawing Sheets

(56) References Cited

U.S. PATENT DOCUMENTS

| | | | |
|---|---|---|---|
| 10,449,929 B2* | 10/2019 | Pflug | B60R 25/33 |
| 10,501,055 B1* | 12/2019 | Yi | B60R 25/257 |
| 2004/0236502 A1 | 11/2004 | Nozaki et al. | |
| 2017/0132934 A1* | 5/2017 | Kentley | G08G 1/202 |
| 2017/0213403 A1* | 7/2017 | Diehl | G07C 9/27 |
| 2018/0136655 A1* | 5/2018 | Kim | H04W 4/024 |
| 2018/0188731 A1* | 7/2018 | Matthiesen | G01C 21/3664 |
| 2019/0031144 A1* | 1/2019 | Gat | B60R 25/25 |
| 2019/0039570 A1* | 2/2019 | Foster | B60R 25/25 |
| 2019/0051174 A1* | 2/2019 | Haque | G01C 21/34 |
| 2019/0061688 A1 | 2/2019 | Watanabe | |
| 2019/0139344 A1 | 5/2019 | Harada et al. | |
| 2020/0010051 A1* | 1/2020 | Dumov | G06V 40/172 |
| 2021/0256500 A1* | 8/2021 | Kuchenski | B60W 60/00256 |

FOREIGN PATENT DOCUMENTS

| | | |
|---|---|---|
| JP | 2004-310316 A | 11/2004 |
| JP | 2016-115364 A | 6/2016 |
| JP | 2019-038420 A | 3/2019 |
| JP | 2019-087103 A | 6/2019 |

* cited by examiner

VEHICLE ALLOCATION SYSTEM, SERVER DEVICE, AND COMPUTER READABLE RECORDING MEDIUM

CROSS-REFERENCE TO RELATED APPLICATIONS

The present application claims priority to and incorporates by reference the entire contents of Japanese Patent Application No. 2019-202500 filed in Japan on Nov. 7, 2019.

BACKGROUND

The present disclosure relates to a vehicle allocation system, a server device, and a computer readable recording medium.

Japanese Laid-open Patent Publication No. 2016-115364 describes a system for performing allocation service of an automatic driving vehicle by unmanned driving through two-step authentication including personal authentication and usage permission authentication.

SUMMARY

There is a need for a system that is able to provide allocation service of an automatic driving vehicle by unmanned driving with improved user convenience.

According to one aspect of the present disclosure, there is provided a vehicle allocation system including: an automatic driving vehicle; a mobile terminal configured to transmit a vehicle allocation request signal containing at least information on a vehicle allocation place of the automatic driving vehicle; and a server configured to allocate the automatic driving vehicle at the vehicle allocation place in response to reception of the vehicle allocation request signal, give a notification to the mobile terminal in response to arrival of the automatic driving vehicle from the vehicle allocation place within a predetermined distance range, and permit usage of the automatic driving vehicle when a user of the mobile terminal is authenticated based on authentication information transmitted from the mobile terminal in response to the notification.

DETAILED DESCRIPTION

A vehicle allocation system according to an embodiment will be described below with reference to the drawings.

Configuration

Figure 1:
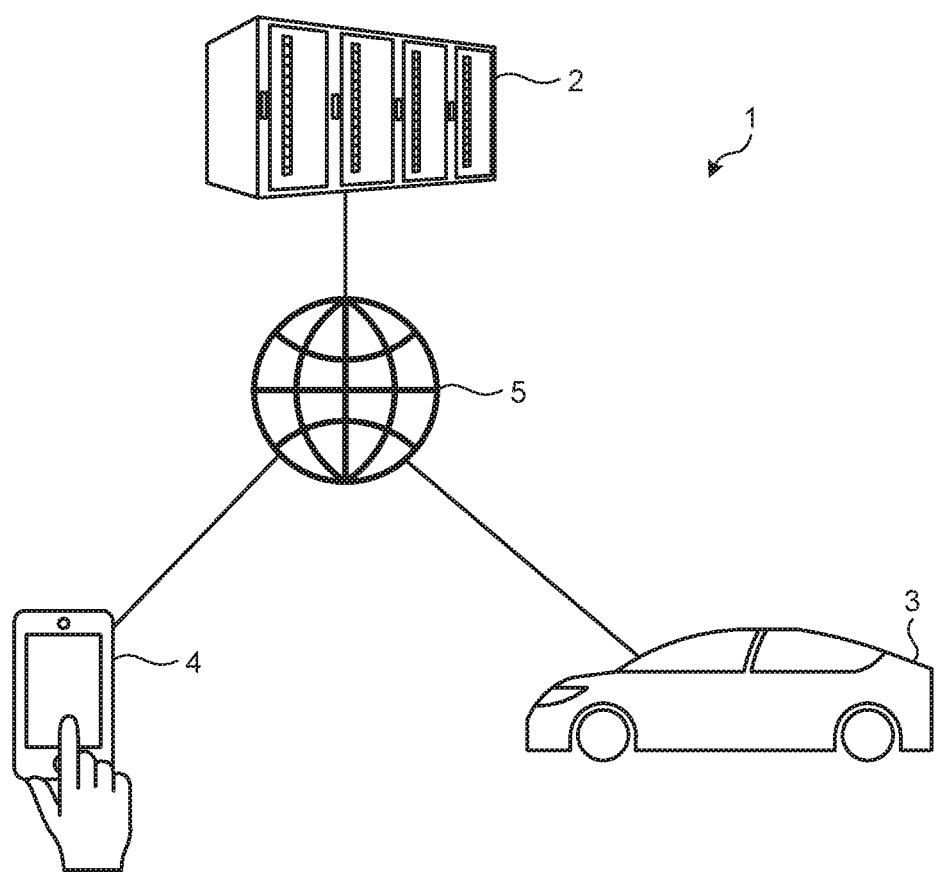
FIG. 1 is a schematic diagram illustrating the configuration of a vehicle allocation system according to an embodiment.
Figure 2:
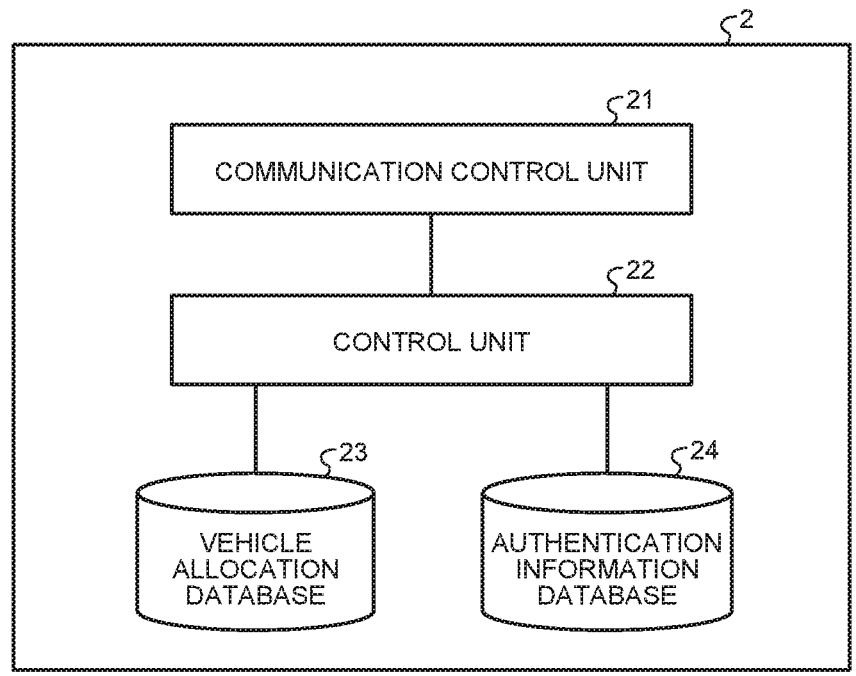
FIG. 2 is a block diagram illustrating the configuration of a server device in FIG. 1.
Figure 3:
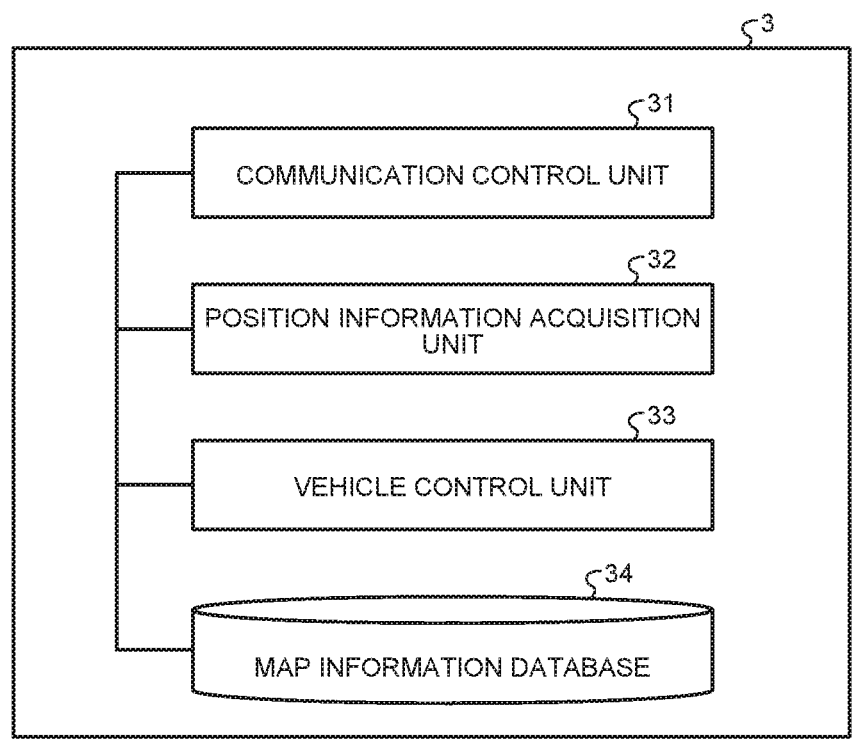
FIG. 3 is a block diagram illustrating the configuration of an automatic driving vehicle in FIG. 1.
Figure 4:
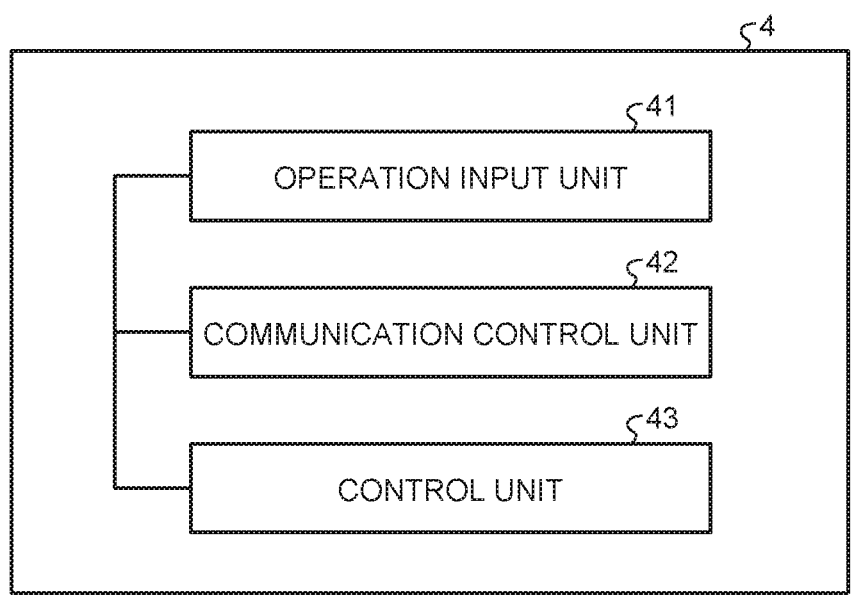
FIG. 4 is a block diagram illustrating the configuration of a mobile terminal device in FIG. 1.

First, the configuration of the vehicle allocation system according to the embodiment will be described with reference to FIGS. 1 to 4. FIG. 1 is a schematic diagram illustrating the configuration of the vehicle allocation system according to the embodiment. FIG. 2 is a block diagram illustrating the configuration of a server device 2 in FIG. 1. FIG. 3 is a block diagram illustrating the configuration of an automatic driving vehicle 3 in FIG. 1. FIG. 4 is a block diagram illustrating the configuration of a mobile terminal device 4 in FIG. 1.

As illustrated in FIG. 1, a vehicle allocation system 1 according to the embodiment provides allocation service of an automatic driving vehicle by unmanned driving, and includes the server device 2, the automatic driving vehicle 3, and the mobile terminal device 4. The server device 2, the automatic driving vehicle 3, and the mobile terminal device 4 are configured so as to communicate information with each other via an electric communication line 5 such as an internet network and a mobile phone network.

As illustrated in FIG. 2, the server device 2 is configured by an information processing device capable of performing various pieces of information processing by using cloud computing technology and edge computing technology. The server device 2 includes a communication control unit 21, a control unit 22, a vehicle allocation database 23, and an authentication information database 24.

The communication control unit 21 is a device that controls information communication between the automatic driving vehicle 3 and the mobile terminal device 4 via the electric communication line 5. Specifically, the communication control unit 21 receives various pieces of information transmitted from the automatic driving vehicle 3 and the mobile terminal device 4 via the electric communication line 5, and transmits various pieces of information to the automatic driving vehicle 3 and the mobile terminal device 4 via the electric communication line 5. A communication unit that communicates information by using a communication unit for a data communication module (DCM) and a mobile wireless communication network may be adopted as the communication control unit 21.

The control unit 22 includes a processor including hardware, such as a central processing unit (CPU), a digital signal processor (DSP), and a field-programmable gate array (FPGA), and a storage unit such as a random access memory (RAM) and a read only memory (ROM). The control unit 22 loads a computer program such as a vehicle allocation program stored in the storage unit into a work area of the storage unit, and executes the computer program to control each unit of the server device 2.

The storage unit may be a recording medium fixed to, for example, a computer or a recording medium removable from, for example, a computer. Examples of the recording medium fixed to, for example, a computer may include an erasable programmable rom (EPROM) and a hard disk drive (HDD). Examples of the recording medium removable from, for example, a computer may include, for example, a universal serial bus (USB) memory, a flexible disk, a magneto-optical disk, a compact disc-read only memory (CD-ROM), a compact disc-rewritable (CD-RW), a digital versatile disc (DVD), a Blu-ray (registered trademark) disc (BD), a digital audio tape (DAT), an 8 mm tape, and a memory card. A solid state drive (SSD) may be used as both the recording medium removable from, for example, a computer and the recording medium fixed to, for example, a computer.

Vehicle allocation plan information such as identification information of a user who desires allocation of the automatic driving vehicle 3, the date, time, and place for allocating the automatic driving vehicle 3, the destination of the automatic driving vehicle 3, and identification information of the automatic driving vehicle 3 are stored in the vehicle allocation database 23.

Authentication information unique to the user who desires allocation of the automatic driving vehicle 3 is stored in the authentication information database 24. Examples of the authentication information may include, for example, identification information, unique to the user, generated at the time of the vehicle allocation, a unique identification information presented at the automatic driving vehicle 3 allocated for the user, sound that may be announced by the automatic driving vehicle 3 allocated for the user, biometric authentication information (e.g., fingerprint, face, and voice) of the user, and unique identification information given to the mobile terminal device 4 owned by the user.

The automatic driving vehicle 3 is a known vehicle such as an electric vehicle (EV), a hybrid vehicle (HV), and a fuel cell electric vehicle (FCEV). The automatic driving vehicle 3 is configured to be capable of unmanned automatic driving (unmanned driving). Here, the unmanned driving means control in which driving operations such as acceleration, deceleration, stop, and steering of the automatic driving vehicle 3 are performed without depending on driving operations of a driver of the automatic driving vehicle 3.

As illustrated in FIG. 3, the automatic driving vehicle 3 includes a communication control unit 31, a position information acquisition unit 32, a vehicle control unit 33, and a map information database 34.

The communication control unit 31 is a device that controls information communication with the server device 2 via the electric communication line 5. Specifically, the communication control unit 31 receives various pieces of information transmitted from the server device 2 via the electric communication line 5, and transmits various pieces of information to the server device 2 via the electric communication line 5. A communication unit that communicates information by using a communication unit for a DCM and a mobile wireless communication network may be adopted as the communication control unit 31.

The position information acquisition unit 32 is a device that detects position information of the automatic driving vehicle 3 by receiving radio waves from a global positioning system (GPS) satellite. A method in which light detection and ranging/laser imaging detection and ranging (LiDAR) is combined with a three-dimensional digital map may be adopted as a method of detecting position information of the automatic driving vehicle 3.

The vehicle control unit 33 includes a processor having hardware, such as a CPU, a DSP, and an FPGA, and a storage unit such as a RAM and a ROM. The vehicle control unit 33 loads a computer program stored in the storage unit into a work area of the storage unit, and executes the computer program to control each unit of the automatic driving vehicle 3. The storage unit may be a recording medium fixed to, for example, a computer or a recording medium removable from, for example, a computer.

The map information database 34 stores map information. Here, the map information is necessary for specifying the positions of, for example, roads, road structures, and facilities. The map information includes, for example, data on each of nodes set on a road (e.g., node ID and coordinates), data on each of links set on the road (e.g., link ID, link name, connection node ID, road coordinates, road type (e.g., toll road and ordinary road), and the number of lanes), and ground object data (e.g., traffic light, road sign, guardrail, and facility).

As illustrated in FIG. 4, the mobile terminal device 4 includes an information processing device capable of communicate information, such as a smartphone. The mobile terminal device 4 includes an operation input unit 41, a communication control unit 42, and a control unit 43.

The operation input unit 41 includes an input device such as a keyboard, a touch panel, a switch, and a microphone. The operation input unit 41 outputs an electric signal indicating information on operation input from a user.

The communication control unit 42 is a device that controls information communication with the server device 2 via the electric communication line 5. Specifically, the communication control unit 42 receives various pieces of information transmitted from the server device 2 via the electric communication line 5, and transmits various pieces of information to the server device 2 via the electric communication line 5. A communication unit that communicates information by using a communication unit for a DCM and a mobile wireless communication network may be adopted as the communication control unit 42.

The control unit 43 includes a processor having hardware, such as a CPU, a DSP, and an FPGA, and a storage unit such as a RAM and a ROM. The control unit 43 loads a computer program stored in the storage unit into a work area of the storage unit, and executes the computer program to control each unit of the mobile terminal device 4. The storage unit may be a recording medium fixed to, for example, a computer or a recording medium removable from, for example, a computer.

The vehicle allocation system 1 having such a configuration provides allocation service of the automatic driving vehicle 3 by unmanned driving with good user convenience by performing vehicle allocation processing described below. Operations of the vehicle allocation system 1 at the time of executing the vehicle allocation processing will be described below with reference to FIGS. 5 and 6.

Vehicle Allocation Processing

Figure 5:
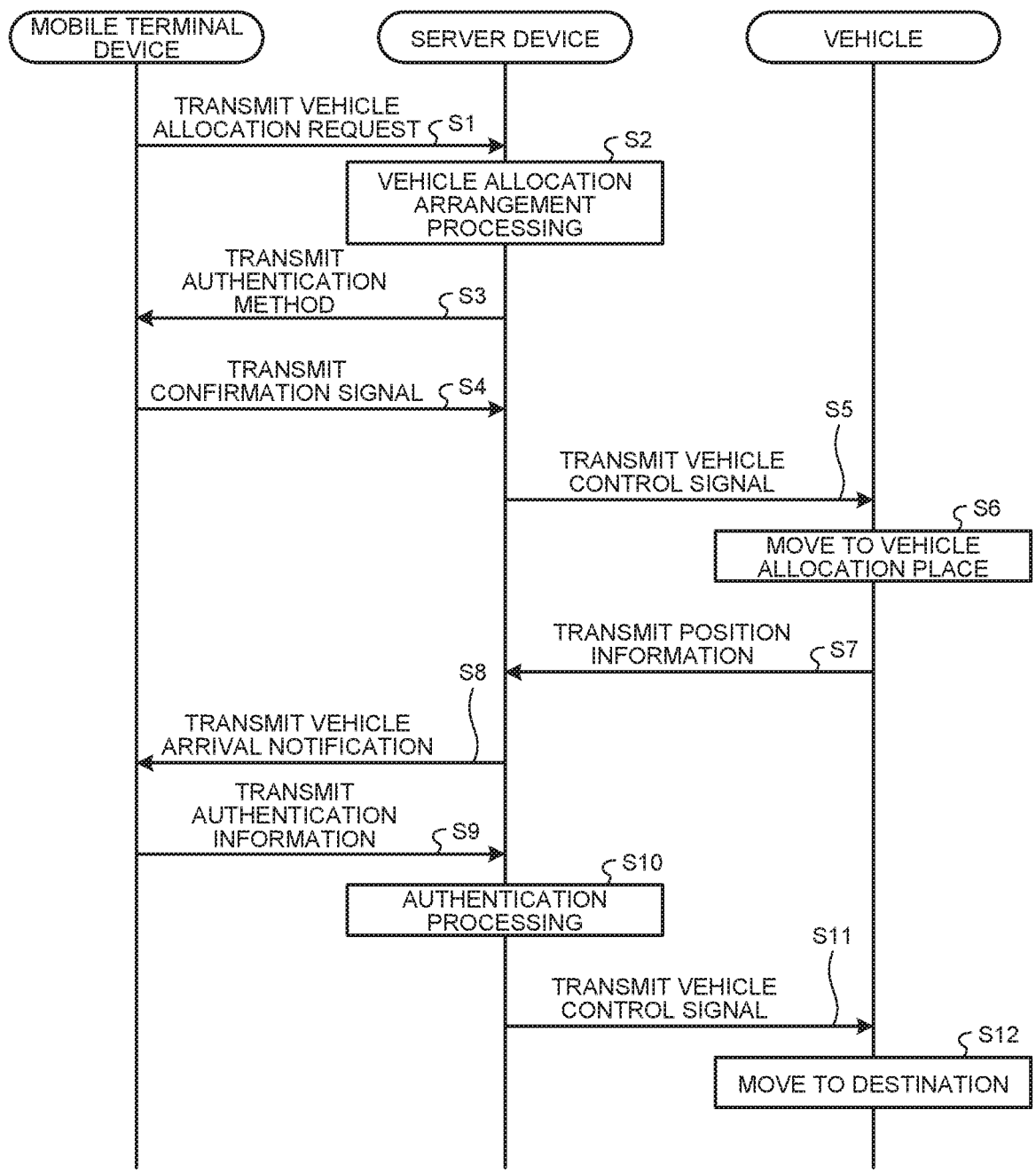
FIG. 5 is a timing chart illustrating the flow of vehicle allocation processing according to the embodiment.

FIG. 5 is a timing chart illustrating the flow of vehicle allocation processing according to the embodiment. The vehicle allocation processing in FIG. 5 starts at the timing when a user of the mobile terminal device 4 connects the server device 2 and the mobile terminal device 4 via the electric communication line 5 by operating the operation input unit 41. The vehicle allocation processing proceeds to the processing of Step S1.

In the processing of Step S1, the user of the mobile terminal device 4 inputs user identification information and information on the date, time, and place at which the automatic driving vehicle 3 is desired to be allocated and destination, and then inputs an instruction to transmit a vehicle allocation request by operating the operation input unit 41. When the instruction to transmit a vehicle allocation request is input, the control unit 43 transmits a vehicle allocation request signal containing information input by the user to the server device 2 via the electric communication line 5 by controlling the communication control unit 42. As a result, the processing of Step S1 is completed, and the vehicle allocation processing proceeds to the processing of Step S2.

In the processing of Step S2, the control unit 22 of the server device 2 creates a vehicle allocation plan for the automatic driving vehicle 3 based on the information contained in the vehicle allocation request signal, and stores the vehicle allocation plan information in the vehicle allocation database 23. As a result, the processing of Step S2 is completed, and the vehicle allocation processing proceeds to the processing of Step S3.

In the processing of Step S3, the control unit 22 of the server device 2 transmits information indicating an authentication method for a user to the mobile terminal device 4 via the electric communication line 5 by controlling the communication control unit 21. Specifically, when the authentication information used for user authentication is identification information unique to a user, the control unit 22 transmits message data saying, for example, please input the following identification information at the time of user authentication. Furthermore, when the authentication information used for user authentication is identification information described in the interior of the automatic driving vehicle 3, the control unit 22 transmits message data saying, for example, please input identification information described in the vehicle interior at the time of user authentication. Furthermore, when the authentication information used for user authentication is biometric authentication information on a user, the control unit 22 transmits message data saying, for example, please input biometric authentication information on a user at the time of user authentication. Furthermore, when the authentication information used for user authentication is unique identification information given to the mobile terminal device 4, the control unit 22 transmits message data saying, for example, please input unique identification information given to the mobile terminal device 4 at the time of user authentication. As a result, the processing of Step S3 is completed, and the vehicle allocation processing proceeds to the processing of Step S4.

In the processing of Step S4, the user of the mobile terminal device 4 inputs an instruction to transmit a confirmation signal for information that has been transmitted by the server device 2 in the processing of Step S3 by operating the operation input unit 41. When the instruction to transmit a confirmation signal is input, the control unit 43 transmits the confirmation signal to the server device 2 via the electric communication line 5 by controlling the communication control unit 42. As a result, the processing of Step S4 is completed, and the vehicle allocation processing proceeds to the processing of Step S5.

In the processing of Step S5, the control unit 22 of the server device 2 transmits a vehicle control signal to the automatic driving vehicle 3 that has been specified to be allocated so that the automatic driving vehicle 3 moves to the vehicle allocation place at the date and time desired by the user based on the vehicle allocation plan information stored in the vehicle allocation database 23. As a result, the processing of Step S5 is completed, and the vehicle allocation processing proceeds to the processing of Step S6.

In the processing of Step S6, the vehicle control unit 33 of the automatic driving vehicle 3 moves to the vehicle allocation place desired by the user through unmanned driving by using the position information acquisition unit 32 and the map information database 34 in accordance with the vehicle control signal that has been transmitted from the server device 2. As a result, the processing of Step S6 is completed, and the vehicle allocation processing proceeds to the processing of Step S7.

In the processing of Step S7, the vehicle control unit 33 of the automatic driving vehicle 3 transmits position information on the automatic driving vehicle 3 acquired by the position information acquisition unit 32 to the server device 2 via the electric communication line 5 by controlling the communication control unit 31. As a result, the processing of Step S7 is completed, and the vehicle allocation processing proceeds to the processing of Step S8.

In the processing of Step S8, the control unit 22 of the server device 2 determines whether the automatic driving vehicle 3 has arrived within a predetermined distance range from the vehicle allocation place based on the position information that has been transmitted from the automatic driving vehicle 3 in the processing of Step S7. Then, the control unit 22 transmits a notification indicating that the automatic driving vehicle 3 has arrived at the vehicle allocation place to the mobile terminal device 4 of the user in response to the arrival of the automatic driving vehicle 3 within the predetermined distance range from the vehicle allocation place. Noted that it may be determined on the side of the automatic driving vehicle 3 whether the automatic driving vehicle 3 has arrived within the predetermined distance range from the vehicle allocation place. The automatic driving vehicle 3 may give the notification to the server device 2 and the mobile terminal device 4 at the timing when the automatic driving vehicle 3 has arrived from the vehicle allocation place within the predetermined distance range. As a result, the processing of Step S8 is completed, and the vehicle allocation processing proceeds to the processing of Step S9.

In the processing of Step S9, the user of the mobile terminal device 4 inputs an authentication information indicated in the processing of Step S3, and then inputs an instruction to transmit the authentication information by operating the operation input unit 41. When the instruction to transmit authentication information is input, the control unit 43 transmits the authentication information to the server device 2 via the electric communication line 5 by controlling the communication control unit 42. As a result, the processing of Step S9 is completed, and the vehicle allocation processing proceeds to the processing of Step S10.

In the processing of Step S10, the control unit 22 of the server device 2 authenticates the user by determining whether the authentication information that has been transmitted in the processing of Step S9 coincides with the authentication information stored in the authentication information database 24. Then, when the user is authenticated, the control unit 22 advances the vehicle allocation processing to the processing of Step S11. In contrast, if the user has not been authenticated, the control unit 22 transmits, for example, an error message to the mobile terminal device 4, and then ends the vehicle allocation processing.

In the processing of Step S11, the control unit 22 of the server device 2 transmits a vehicle control signal to the automatic driving vehicle 3 so that the automatic driving vehicle 3 moves to the destination desired by the user based on the vehicle allocation plan information stored in the vehicle allocation database 23. As a result, the processing of Step S11 is completed, and the vehicle allocation processing proceeds to the processing of Step S12.

In the processing of Step S12, the vehicle control unit 33 of the automatic driving vehicle 3 moves to the destination desired by the user through unmanned driving by using the position information acquisition unit 32 and the map information database 34 in accordance with the vehicle control signal that has been transmitted from the server device 2. As a result, the processing of Step S12 is completed, and a series of vehicle allocation processing is finished.

As is clear from the above description, in the vehicle allocation system according to the embodiment, the server device 2 gives a notification to the mobile terminal device 4 in response to the arrival of the automatic driving vehicle 3 from a vehicle allocation place within a predetermined distance range. When a user of the mobile terminal device 4 is authenticated based on the authentication information that has been transmitted from the mobile terminal device 4 in response to the notification, the server device 2 permits usage of the automatic driving vehicle 3. This enables a user to easily determine which the automatic driving vehicle allocated for the user him- or herself is even when there are many people and vehicles at the vehicle allocation place. Furthermore, it is possible to prevent a malicious user from using the allocated automatic driving vehicle 3. As a result, there may be provided allocation service of an automatic driving vehicle by unmanned driving with improved user convenience.

Variation

Figure 6:
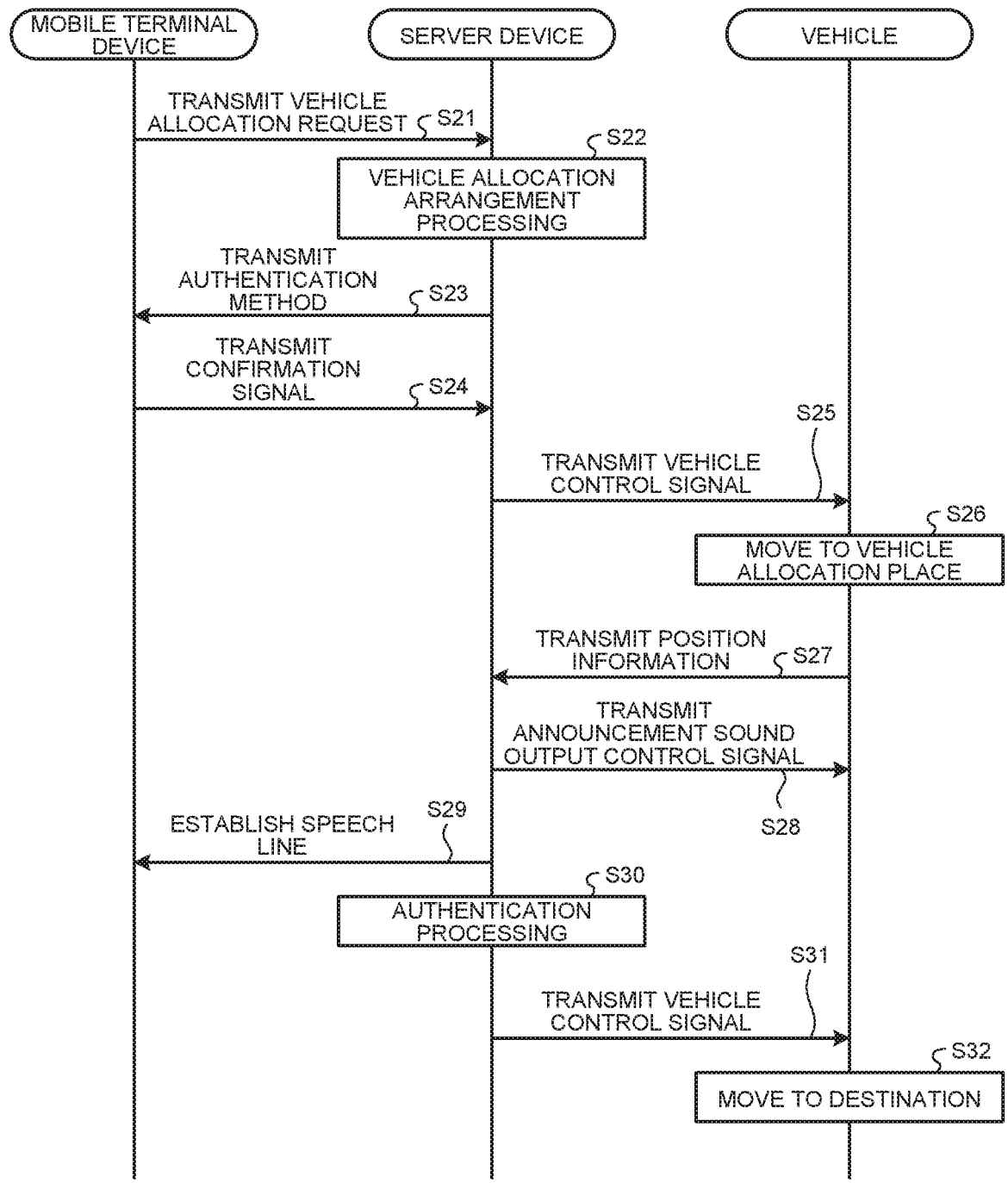
FIG. 6 is a timing chart illustrating the flow of a variation of vehicle allocation processing in FIG. 1.

FIG. 6 is a timing chart illustrating the flow of a variation of vehicle allocation processing in FIG. 1. The vehicle allocation processing in FIG. 6 starts at the timing when a user of the mobile terminal device 4 connects the server device 2 and the mobile terminal device 4 via the electric communication line 5 by operating the operation input unit 41. The vehicle allocation processing proceeds to the processing of Step S21. Note that the content of the processing of Steps S21 and S22 is the same as that of the above-described processing of Steps S1 and S2, so that the description thereof will be omitted below. The description will start from the processing of Step S23.

In the processing of Step S23, the control unit 22 of the server device 2 transmits information indicating an authentication method for a user to the mobile terminal device 4 via the electric communication line 5 by controlling the communication control unit 21. Specifically, the control unit 22 transmits message data saying, for example, please transmit announcement sound of the automatic driving vehicle 3. As a result, the processing of Step S23 is completed, and the vehicle allocation processing proceeds to the processing of Step S24.

In the processing of Step S24, the user of the mobile terminal device 4 inputs an instruction to transmit a confirmation signal for information that has been transmitted by the server device 2 in the processing of Step S23 by operating the operation input unit 41. When the instruction to transmit a confirmation signal is input, the control unit 43 transmits the confirmation signal to the server device 2 via the electric communication line 5 by controlling the communication control unit 42. As a result, the processing of Step S24 is completed, and the vehicle allocation processing proceeds to the processing of Step S25.

In the processing of Step S25, the control unit 22 of the server device 2 transmits a vehicle control signal to the automatic driving vehicle 3 so that the automatic driving vehicle 3 moves to the vehicle allocation place at the date and time desired by the user based on the vehicle allocation plan information stored in the vehicle allocation database 23. As a result, the processing of Step S25 is completed, and the vehicle allocation processing proceeds to the processing of Step S26.

In the processing of Step S26, the vehicle control unit 33 of the automatic driving vehicle 3 moves to the vehicle allocation place desired by the user through unmanned driving by using the position information acquisition unit 32 and the map information database 34 in accordance with the vehicle control signal that has been transmitted from the server device 2. As a result, the processing of Step S26 is completed, and the vehicle allocation processing proceeds to the processing of Step S27.

In the processing of Step S27, the vehicle control unit 33 of the automatic driving vehicle 3 transmits position information on the automatic driving vehicle 3 acquired by the position information acquisition unit 32 to the server device 2 via the electric communication line 5 by controlling the communication control unit 31. As a result, the processing of Step S27 is completed, and the vehicle allocation processing proceeds to the processing of Step S28.

In the processing of Step S28, the control unit 22 of the server device 2 determines whether the automatic driving vehicle 3 has arrived from the vehicle allocation place within a predetermined distance range based on the position information that has been transmitted from the automatic driving vehicle 3 in the processing of Step S27. Then, the control unit 22 transmits a control signal that gives an instruction to output announcement sound to the automatic driving vehicle 3 in response to the arrival of the automatic driving vehicle 3 from the vehicle allocation place within the predetermined distance range. The vehicle control unit 33 of the automatic driving vehicle 3 outputs announcement sound in accordance with a control signal from the server device 2. As a result, the processing of Step S28 is completed, and the vehicle allocation processing proceeds to the processing of Step S29.

In the processing of Step S29, the control unit 22 of the server device 2 establishes a speech line with the mobile terminal device 4 by controlling the communication control unit 21. As a result, the processing of Step S29 is completed, and the vehicle allocation processing proceeds to the processing of Step S30.

In the processing of Step S30, the control unit 22 of the server device 2 authenticates the user by determining whether the announcement sound of the automatic driving vehicle 3 which has been transmitted from the mobile terminal device 4 coincides with the announcement sound of the automatic driving vehicle 3 stored in the authentication information database 24. Then, when the user is authenticated, the control unit 22 advances the vehicle allocation processing to the processing of Step S31. In contrast, if the user has not been authenticated, the control unit 22 transmits, for example, an error message to the mobile terminal device 4, and then ends the vehicle allocation processing.

In the processing of Step S31, the control unit 22 of the server device 2 transmits a vehicle control signal to the automatic driving vehicle 3 so that the automatic driving vehicle 3 moves to the destination desired by the user based on the vehicle allocation plan information stored in the vehicle allocation database 23. As a result, the processing of Step S31 is completed, and the vehicle allocation processing proceeds to the processing of Step S32.

In the processing of Step S32, the vehicle control unit 33 of the automatic driving vehicle 3 moves to the destination desired by the user through unmanned driving by using the position information acquisition unit 32 and the map information database 34 in accordance with the vehicle control signal that has been transmitted from the server device 2. As a result, the processing of Step S32 is completed, and a series of vehicle allocation processing is finished.

According to the present disclosure, an allocation service of an automatic driving vehicle by unmanned driving with improved user convenience may be provided.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A vehicle allocation system comprising:
   an automatic driving vehicle;

a mobile terminal configured to transmit a vehicle allocation request signal containing at least information on a vehicle allocation place of the automatic driving vehicle; and a server configured to allocate the automatic driving vehicle at the vehicle allocation place in response to reception of the vehicle allocation request signal, determine whether the automatic driving vehicle has arrived from the vehicle allocation place within a predetermined distance range based on position information transmitted from the automatic driving vehicle, give a notification to the mobile terminal in response to arrival of the automatic driving vehicle from the vehicle allocation place within the predetermined distance range, and permit usage of the automatic driving vehicle when a user of the mobile terminal is authenticated based on authentication information transmitted from the mobile terminal in response to the notification, the authentication information is sound announced by the automatic driving vehicle that is in accordance with an instruction that is transmitted by the server, wherein the server is configured to establish a speech line with the mobile terminal, and the server comprises an authentication database, the server is further configured to authenticate the user of the mobile terminal by determining whether the sound announced by the automatic driving vehicle which has been transmitted by the mobile terminal coincides with a sound announced of the automatic driving vehicle that is stored in the authentication database.

2. The vehicle allocation system according to claim 1, wherein the server is configured to transmit information on an authentication method for the user to the mobile terminal in response to the reception of the vehicle allocation request signal, and the mobile terminal is configured to transmit the authentication information in accordance with the authentication method to the server in response to the notification.

3. A server comprising:

an authentication database;

a processor comprising hardware, the processor being configured to:

allocate an automatic driving vehicle to a vehicle allocation place in response to reception of a vehicle allocation request signal containing at least information on the vehicle allocation place of the automatic driving vehicle, the vehicle allocation request signal being transmitted from a mobile terminal;

determine whether the automatic driving vehicle has arrived from the vehicle allocation place within a predetermined distance range based on position information transmitted from the automatic driving vehicle;

give a notification indicating that the automatic driving vehicle has arrived to the mobile terminal in response to arrival of the automatic driving vehicle from the vehicle allocation place within the predetermined distance range; and permit usage of the automatic driving vehicle when a user of the mobile terminal is authenticated based on authentication information transmitted from the mobile terminal in response to the notification, the authentication information is announcement sound announced by the automatic driving vehicle that is in accordance with an instruction that is transmitted by the processor, wherein the processor is further configured to establish a speech line with the mobile terminal; and the processor is further configured to authenticate the user of the mobile terminal by determining whether the sound announced by the automatic driving vehicle which has been transmitted by the mobile terminal coincides with a sound announced of the automatic driving vehicle that is stored in the authentication database.

4. The server according to claim 3, wherein the processor is configured to transmit information on an authentication method for the user to the mobile terminal in response to the reception of the vehicle allocation request signal.

5. A non-transitory computer-readable recording medium on which an executable program is recorded, the program instructing a processor to execute:

allocating an automatic driving vehicle to a vehicle allocation place in response to reception of a vehicle allocation request signal containing at least information on the vehicle allocation place of the automatic driving vehicle, the vehicle allocation request signal being transmitted from a mobile terminal;

determining whether the automatic driving vehicle has arrived from the vehicle allocation place within a predetermined distance range based on position information transmitted from the automatic driving vehicle;

giving a notification indicating that the automatic driving vehicle has arrived to the mobile terminal in response to arrival of the automatic driving vehicle from the vehicle allocation place within the predetermined distance range; and permitting usage of the automatic driving vehicle when a user of the mobile terminal is authenticated based on authentication information transmitted from the mobile terminal in response to the notification, the authentication information is announcement sound announced by the automatic driving vehicle that is in accordance with an instruction that is transmitted by the processor, wherein the program instructs the processor to establish a speech line with the mobile terminal; and the program instructs the processor to authenticate the user of the mobile terminal by determining whether the sound announced by the automatic driving vehicle which has been transmitted by the mobile terminal coincides with a sound announced of the automatic driving vehicle that is stored in an authentication database of a server.

6. The non-transitory computer-readable recording medium according to claim 5, wherein the program instructs the processor to execute transmitting information on an authentication method for the user to the mobile terminal in response to the reception of the vehicle allocation request signal.

7. The vehicle allocation system according to claim 1, wherein the server further comprises a vehicle allocation database, and the server is further configured to:

create a vehicle allocation plan for the automatic driving vehicle based on the information contained in the vehicle allocation request signal, store the vehicle allocation plan in the vehicle allocation database, and transmit, to the autonomous driving vehicle, a vehicle control signal so that the autonomous driving vehicle moves to a destination at a given time desired by the user based on the vehicle allocation plan stored in the vehicle allocation database.

8. The server according to claim 3, further comprising a vehicle allocation database, and the processor is further configured to:
- create a vehicle allocation plan for the automatic driving vehicle based on the information contained in the vehicle allocation request signal,
- store the vehicle allocation plan in the vehicle allocation database, and
- transmit, to the autonomous driving vehicle, a vehicle control signal so that the autonomous driving vehicle moves to a destination at a given time desired by the user based on the vehicle allocation plan stored in the vehicle allocation database.

9. The non-transitory computer-readable recording medium according to claim 5, wherein the program instructs the processor to:
- create a vehicle allocation plan for the automatic driving vehicle based on the information contained in the vehicle allocation request signal,
- store the vehicle allocation plan in a vehicle allocation database of the server, and
- transmit, to the autonomous driving vehicle, a vehicle control signal so that the autonomous driving vehicle moves to a destination at a given time desired by the user based on the vehicle allocation plan stored in the vehicle allocation database.

\* \* \* \* \*